United States Patent
Schuller et al.

(10) Patent No.: US 12,377,614 B2
(45) Date of Patent: Aug. 5, 2025

(54) WELDING APPARATUS AND METHOD FOR EVALUATING AN OPERATING STATE OF A WELDING APPARATUS

(71) Applicants: ROPEX Industrie-Elektronik GmbH, Bietigheim-Bissingen (DE); Force Global—ROPEX America LLC, Germantown, WI (US)

(72) Inventors: Manuel Schuller, Bietigheim-Bissingen (DE); Michael Parkinson, Hubertus, WI (US)

(73) Assignees: ROPEX Industrie-Elektronic GmbH, Bietigheim-Bissingen (DE); Force Global—ROPOX America LLC, Germantown, WI (US)

( * ) Notice: Subject to any disclaimer, the term of this patent is extended or adjusted under 35 U.S.C. 154(b) by 194 days.

(21) Appl. No.: 18/096,694

(22) Filed: Jan. 13, 2023

(65) Prior Publication Data
US 2024/0239055 A1 Jul. 18, 2024

(51) Int. Cl.
*B29C 65/18* (2006.01)
*B29C 65/00* (2006.01)

(52) U.S. Cl.
CPC ........ *B29C 66/91421* (2013.01); *B29C 65/18* (2013.01); *B29C 66/8322* (2013.01);
(Continued)

(58) Field of Classification Search
CPC ....... B29C 65/18; B29C 65/22; B29C 65/221; B29C 65/222; B29C 65/223;
(Continued)

(56) References Cited

U.S. PATENT DOCUMENTS 2,509,439 A * 5/1950 Langer .............. B29C 66/83221
219/453.11
2,582,581 A * 1/1952 Bona ................... B29C 66/1122
165/185
(Continued)

FOREIGN PATENT DOCUMENTS

GB 1520556 A * 8/1978 ........... B29C 65/224
WO WO-9214600 A1 * 9/1992 ............. B29C 65/02

OTHER PUBLICATIONS

European Search Report dated Jul. 4, 2024.

*Primary Examiner* — Michael A Tolin
(74) *Attorney, Agent, or Firm* — Hoffmann & Baron, LLP

(57) ABSTRACT

A welding apparatus includes: a first heating stack, wherein a first heating layer is electrically connected to a first electronic control circuit and is located between a first cover layer and a first electric insulator which is mounted on a first ledge; a second heating stack, wherein a second heating layer is electrically connected to a second electronic control circuit and is located between a second cover layer and a second electric insulator which is mounted on a second ledge, wherein the first heating stack and the second heating stack are coupled to a drive to provide a linear relative movement between the first heating stack and the second heating stack, and wherein the first electronic control circuit is adapted to provide electric energy to the first heating layer and wherein the second electronic control circuit is adapted to detect an electric resistance and/or an electric impedance of the second heating layer.

4 Claims, 2 Drawing Sheets

(52) U.S. Cl.
CPC .. *B29C 66/91317* (2013.01); *B29C 66/91651* (2013.01); *B29C 66/961* (2013.01)

(58) Field of Classification Search
CPC ... B29C 65/224; B29C 65/38; B29C 66/0042; B29C 66/0044; B29C 66/112; B29C 66/1122; B29C 66/41; B29C 66/43; B29C 66/73921; B29C 66/8122; B29C 66/81811; B29C 66/81871; B29C 66/81881; B29C 66/822; B29C 66/8223; B29C 66/8227; B29C 66/824; B29C 66/8242; B29C 66/8246; B29C 66/8322; B29C 66/83221; B29C 66/912; B29C 66/9121; B29C 66/91211; B29C 66/91212; B29C 66/91213; B29C 66/91221; B29C 66/91231; B29C 66/9131; B29C 66/91311; B29C 66/91313; B29C 66/91315; B29C 66/91317; B29C 66/914; B29C 66/9141; B29C 66/91411; B29C 66/91421; B29C 66/9161; B29C 66/91651; B29C 66/91653; B29C 66/91655; B29C 66/96; B29C 66/961; B29K 2827/18; B29K 2871/00

See application file for complete search history.

(56) References Cited

U.S. PATENT DOCUMENTS 2,682,294 A * 6/1954 Langer ............. B29C 66/81881
156/583.2
4,869,051 A 9/1989 Shifley et al.

* cited by examiner

WELDING APPARATUS AND METHOD FOR EVALUATING AN OPERATING STATE OF A WELDING APPARATUS

BACKGROUND OF THE INVENTION

The invention refers to a welding apparatus, comprising: a first heating stack, wherein a first heating layer is electrically connected to a first electronic control circuit and is located between a first cover layer and a first electric insulator, which first electric insulator is mounted on a first ledge; a second heating stack, wherein a second heating layer is electrically connected to a second electronic control circuit and is located between a second cover layer and a second electric insulator, which second electric insulator is mounted on a second ledge; wherein a first welding surface of the first cover layer is arranged opposite to a second welding surface of the second cover layer; wherein the first heating stack is coupled to a first drive component of a drive and wherein the second heating stack is coupled to a second drive component of the drive, wherein the drive is adapted to provide a relative movement between the first heating stack and the second heating stack.

SUMMARY OF THE INVENTION

The goal of the invention is to improve the quality of a result of the welding process.

According to a first aspect of the invention this goal is achieved in that the first electronic control circuit is adapted to provide electric energy to the first heating layer and wherein the second electronic control circuit is adapted to detect an electric resistance and/or an electric impedance of the second heating layer.

The first electronic control circuit may include a microprocessor and an output stage or power amplifier connected with the microprocessor, wherein the microprocessor provides a power signal to the output stage and the output stage provides an electric current to the first heating layer. Typically a power transformer is arranged between the output stage and the first heating layer and transforms the electric current provided by the output stage from a high electric tension to a low electric tension.

The first heating layer is part of the first heating stack, which is also called a sealing bar and comprises several layers of different materials which are backed on a first ledge. Each of the layers is a sheet of material, in particular of rectangular shape, which is connected with adjacent layers. The first heating stack is constituted from the first ledge, the first electric insulator which is connected with the first ledge and with the first heating layer, the first heating layer which is connected with the first electric insulator and with the first cover layer and the first cover layer which is connected with the first heating layer.

Preferably the design of the second heating stack or second sealing bar is similar or identical with the aforementioned design of the first heating stack.

Due to the supply of electric power to the first heating layer a temperature of the first heating layer increases and therefore also a temperature of the first cover layer as well as temperatures of the first electric insulator and of the first ledge increase.

In a normal operation of the welding apparatus, which comprises the first heating stack, the first electronic control circuit, the second heating stack and the second electronic control circuit, both the first heating stack and the second heating stack are provided with electric energy by the respective first and second electronic control circuits. This enables a welding of at least two layers of plastic sheet material which are located in a welding gap which extends between a first welding surface of the first cover layer and a second welding surface of the second cover layer, wherein the second welding surface is opposed to the first welding surface. Furthermore the welding gap is closed before and/or during the welding process by means of a drive, in particular an electric linear drive or a hydraulic linear drive or a pneumatic linear drive. In any case the first heating stack is coupled to a first drive component of the drive and the second heating stack is coupled to a second drive component of the drive to allow the required adjustment of the distance between the first welding surface and the second welding surface which results in a local compression of the plastic sheet material to support the welding process. The first drive component may be a housing of a linear electric motor or a housing of a hydraulic or pneumatic actuator. The second drive component may be a rotor or a plunger rod or a piston rod of the respective linear drive.

However for improving the quality of the result of the welding process it is necessary to gather information about the performance of the components of the welding apparatus, in particular of the components which are subject to wear during the welding process. Therefore the welding apparatus is operated in a test mode, in which only the first electronic control circuit provides electric energy to the first heating layer whereas the second electronic control circuit detects an electric resistance and/or an electric impedance of the second heating layer. The detection of the respective resistance and/or impedance value allows an evaluation of a heat transfer/energy transfer from the first heating stack to the second heating stack, since the heat generated by the first heating stack is transferred to the second heating stack and increases the temperature of the second heating layer. This temperature increase results in an increase of the electric resistance of the second heating layer. This electric resistance may be detected with an DC or AC current which is provided by the second electric control circuit to the second heating layer. This DC or AC current is only a fractional amount of the electric energy which is provided from the first electric control circuit to the first heating layer to avoid unintended heating of the second heating layer. The second electric control circuit monitors the resistance and/or impedance value by current metering and/or voltage metering and may include an electronic storage for storing the detected resistance and/or impedance values.

Furthermore the second electric control circuit may be adapted to compare the detected resistance and/or impedance values with stored detected resistance and/or impedance values to gather information about the heat transfer/energy transfer characteristics between the first heating stack and the second heating stack. The second electric control circuit may provide a result of this comparison as an electric signal, in particular as a digital signal, at an interface to enable a transmission of this signal to a machine control or to a human machine interface of a handheld computer or laptop.

According to an improvement of the invention the first electronic control circuit is adapted to detect an electric resistance and/or an electric impedance of the first heating layer and wherein the second electronic control circuit is to provide electric energy to the second heating layer. This allows an analysis of the characteristics of the first and second heating stack in a bidirectional manner.

According to a further improvement of the invention the first ledge and the second ledge are made from a metal material and/or comprise a cooling channel, respectively; and/or wherein the first electric insulator and the second electric insulator are made from a heat resistant silicone material, respectively; and/or wherein the first cover layer and the second cover layer are made from a heat resistant non-adhesive material from the group: PEEK, PTFE.

The first ledge and the second ledge typically are manufactured from steel or aluminium and preferably are shaped like a cuboid, bar or brick which extends in all three dimensions (length, depth, height). Typically one of the dimensions of the ledge is greater than the other two dimensions and a fluid channel extends in this direction through the first/second ledge for cooling purposes. Preferably a fluid is pumped through the respective cooling channel to cool the respective first or second heating stack.

The task of the first electric insulator and the second electric insulator is to ensure an electric insulation between the first/second ledge and the first/second heating layer. Furthermore the first/second electric insulator has to ensure a low thermal resistance between the first/second ledge and the first/second heating layer to allow an efficient cooling of the first/second heating layer.

The first cover layer and the second cover layer has to ensure non-stick properties of the first welding surface and the second welding surface to avoid an unintended adhesion of the plastic sheet material to be welded with the welding apparatus. Typically the first cover layer and the second cover layer are made from a heat resistant non-adhesive material from the group: PEEK (Polyetheretherketone), PTFE (Polytetrafluorethylene).

According to a second aspect of the invention the goal of the invention is achieved with a method for evaluating an operating state of a welding apparatus, which method includes the steps of: providing electric energy from a first electronic control circuit to a first heating layer of a first heating stack, which first heating layer is located between a first cover layer and a first electric insulator, which first electric insulator is mounted on a first ledge; detecting a second electric resistance value and/or a second electric impedance value of a second heating layer of a second heating stack, which second heating layer is connected with a second electronic control circuit and which is located between a second cover layer and a second electric insulator, which second electric insulator is mounted on a second ledge; a first welding surface of the first cover layer being thermally coupled with a second welding surface of the second cover layer.

The purpose of the method is to analyze the characteristics of the first heating stack and the second heating stack based on a heat transfer/energy transfer between the two heating stacks. The method includes the step of providing electric energy to the first heating layer to increase the temperature of the first heating stack. Furthermore the method includes the step of detecting the second electric resistance value and/or the second electric impedance value of the second heating stack, in particular of the second heating layer of the second heating stack, to gather information about the powerless heating up of the second heating layer due to the heat transfer/energy transfer from the first heating layer.

According to an improvement of the method the first electronic control circuit provides the electric energy to the first heating layer and the second electronic control circuit detects the second electric resistance value and/or the second electric impedance value of the second heating layer during a direct physical contact of the first welding surface with the second welding surface. The first welding surface and the second welding surface are not separated by an additional layer of material or an air gap, but are pressed together, in particular by means of the linear drive, to ensure the intended direct physical contact.

According to an alternative improvement of the method the first electronic control circuit provides the electric energy to the first heating layer and the second electronic control circuit detects the second electric resistance value and/or the second electric impedance value of the second heating layer when at least one product layer is arranged between the first welding surface and the second welding surface. In this case the characteristics of the welding apparatus and in particular of the first heating stack and the second heating stack are determined in a production situation, in which the product to be welded is arranged in the welding gap between the first heating stack and the second heating stack. Typically the product to be welded is an arrangement of at least two layers of plastic sheet material.

According to a further improvement of the method the first electronic control circuit provides the electric energy to the first heating layer and the second electronic control circuit detects the second electric resistance value and/or the second electric impedance value of the second heating layer when a cooling for the first ledge and/or a cooling for the second ledge is activated. The cooling for the first/second ledge is realized with a cooling channel or bore in the respective ledge, which cooling channel is connected with a tube system, in particular comprising a fluid pump and a fluid cooler. The activation of the cooling allows a more realistic characterization of the first/second heating stacks since the cooling is typically active during a production use of the welding apparatus.

According to a further improvement of the method the first electronic control circuit detects a first electric resistance value and/or a first electric impedance value of the first heating layer during the provision of the electric energy from the first electronic control circuit to the first heating layer and provides the first electric resistance value and/or the first electric impedance value to the second electronic control circuit and wherein the second electronic control circuit compares the first electric resistance value and/or the first electric impedance value with the second electric resistance value and/or with the second electric impedance value of the second heating layer to calculate a heat transfer rate between the first heating stack and the second heating stack. The detection of the first electric resistance value and/or the first electric impedance value allows a determination of a temperature of the first heating layer during a heating phase for the first heating layer. With the temperature information for the first heating layer being provided to the second electronic control circuit a more detailed analysis of the temperature/heat transfer characteristics between the first heating stack and the second heating stack is enabled.

According to a further improvement of the method the second electronic control circuit starts with the detection of the second electric resistance value and/or the second electric impedance value as soon as the first electronic control circuit provides the electric energy to the first heating layer and the second electronic control circuit compares a progression of the second electric resistance value and/or the second electric impedance value with a stored progression of the second electric resistance value and/or the second electric impedance value. This allows an analysis of the temperature increase in the second heating layer during the heat up phase for the first heating layer. For example both the first heating layer and the second heating layer are cooled to a predetermined start temperature by means of the respective cooling system. As soon as the first electronic control circuit provides the electric energy to the first heating layer the temperature of the first heating layer increases and the heat dissipated from the first heating layer is transferred through the first cover layer and the second cover layer to the second heating layer. Hence the second electric resistance value and/or the second electric impedance value as detected by the second electronic control circuit changes and the progression (change rate or gradient) of at least one of these values can be calculated by the second electronic control circuit. Furthermore the progression of the second electric resistance value and/or the second electric impedance value may be compared with a stored progression of the second electric resistance value and/or the second electric impedance value to draw a conclusion directed to the characteristics of the first heating stack and the second heating stack.

According to an alternative improvement of the method the second electronic control circuit starts with the detection of the second electric resistance value and/or the second electric impedance value after the first electronic control circuit has provided the electric energy to the first heating layer for a predetermined time interval and the second electronic control circuit compares a progression of the second electric resistance value and/or the second electric impedance value with a stored progression of the second electric resistance value and/or the second electric impedance value. In this case the detection phase of the second electronic control circuit may cover a timeframe in which the first heating layer is already heated up to a predetermined target temperature and then the provision of the electric energy from the first electronic control circuit to the first heating layer is terminated. Due to the interruption of the energy supply a cooling phase, in particular supported by the cooling of the first ledge, starts and therefore the heat transfer/energy transfer between the first heating stack and the second heating stack is reduced. This reduction results in a decrease of the temperature of the second heating layer and therefore in a change of the second electric resistance value and/or the second electric impedance value of the second heating layer.

BRIEF DESCRIPTION OF THE DRAWINGS

A preferred embodiment of the invention is shown in the drawing.

DETAILED DESCRIPTION

Figure 1:
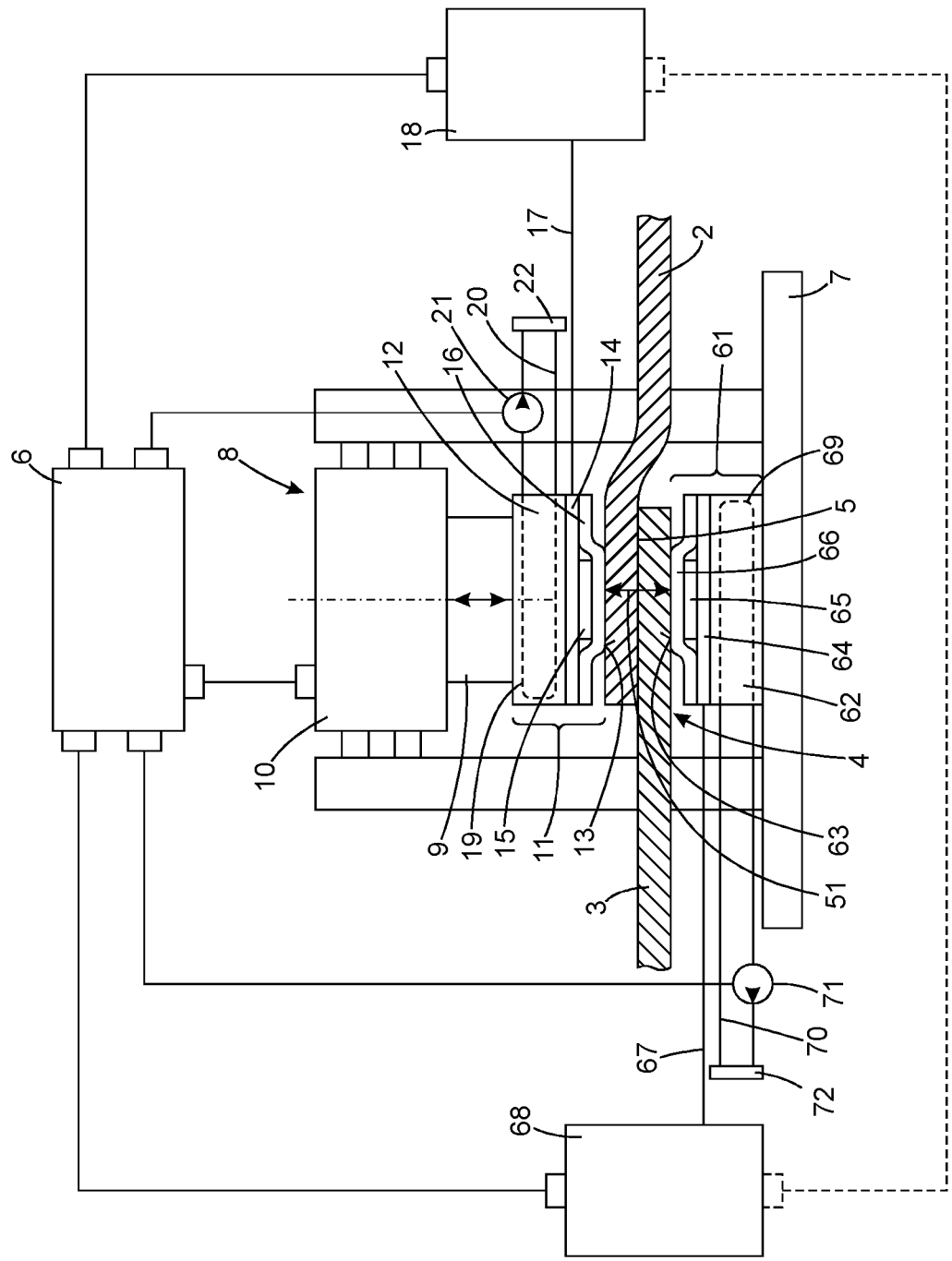
FIG. 1 shows a strictly schematic representation of a welding apparatus according to the invention.

A welding apparatus 1 shown purely schematically in the non-scale FIG. 1 is provided for a material-to-material welding process between a first plastic film layer 2 and a second plastic film 3 in an overlap region 5. Just as an example the first plastic film 2 and the second plastic film 3 each have the same thickness and are each arranged with an edge region overlapping, whereby the overlap region 5 is formed. This overlap region 5 is used for welding (bonding by means of melting of the plastic material) the plastic film layers 2, 3 by means of the welding apparatus 1. For this reason the overlap region 5 is placed in a welding zone 4, which is also called a welding gap and which is bound by a first heating stack 11 or sealing bar and a second heating stack 61 or sealing bar arranged opposite the first heating stack 11.

Purely by way of example, both the first heating stack 11 and the second heating stack 61 extend in a spatial direction which is aligned normal to the plane of representation of FIG. 1 over a length which is considerably greater than the cross-sectional profiling of the first heating stack 11 and the second heating stack 61 which can be seen in FIG. 1.

Exemplarily, the first heating stack 11 comprises a first ledge 12 which is rectangularly profiled according to the representation of FIG. 1 and which extends normal to the representation plane of FIG. 1 with a longest edge (not shown). Purely by way of example, the first ledge 12 is machined from aluminium. A surface of the first ledge 12 is called a first working surface 13 and carries a strip-like-shaped first electric insulator 14 which covers the whole first working surface 13. Preferably the electric insulator 14 is machined from a heat resistant silicone material and is adhesively bonded to the first working surface 13. The first electric insulator 14 carries a strip-like-shaped first heating layer 15 or heating band. The first heating layer 15 extends only over a fraction of the width of the first electric insulator 14. A first cover layer 16 covers the first heating layer 15, which first heating layer 15 is adhesively bonded to the electric insulator 14 and to the first cover layer 16. Furthermore the first cover layer 16 is adhesively bonded to the first electric insulator 14 and therefore ensures a sealing for the first heating layer 15. A first electric cord 17 which includes several electric lines (not shown) is connected with a first electronic control circuit 18, which is adapted to provide electric energy to the first heating layer 15. Additionally the first electronic control circuit 18 may be adapted to determine a first electric resistance value and/or a first electric impedance value of the first heating layer 15.

A U-shaped first fluid channel 19 is located in the first ledge 12 to allow a cooling of the first ledge with a cooling fluid. The first fluid channel 19 is connected with a first pump 21 and with a first fluid cooler 22 by means of a first fluid tube system 20, whereas the aforementioned components form a closed fluid circuit. The first fluid pump 21 is adapted to pump a cooling fluid through the first fluid cooler 22, the first fluid tube system 20 and the first fluid channel 19 to enable a cooling of the first ledge 12.

The second heating stack 61 is constructed in the same way as the first heating stack 11, therefore a detailed description of the second heating stack is omitted and functional identical components are numbered with reference the numbers of the first heating stack 11 plus an amount of 50.

The second heating stack 61 is connected with a second electronic control circuit 68 via a second cord 67. The second electronic control circuit 68 is adapted to determine a second electric resistance value and/or a second electric impedance value of the second heating layer 65. Furthermore the second electronic control circuit 68 is adapted to provide electric energy to the second heating layer 65. In particular the first electronic control circuit 18 and the second electronic control circuit 68 are technically identical.

Both the first electronic control circuit 18 and the second electronic control circuit 68 are electrically connected to a welding controller 6, which serves to coordinate the functions of the first/second electronic control circuits 18/68 to enable a welding process or a detection process for the welding machine 1.

According to FIG. 1, the first heating stack 11 is connected with an actuator rod 9 of an actuator 8, wherein the actuator 8 is an electrically or fluidically driven linear actuator, whereas the second heating stack 61 rests on a working table 7. The actuator 8 is a drive and the actuator rod 9 is a first drive component. An actuator housing 10 of the actuator 8 is fixed to the working table 7. The actuator housing 10 is a second drive component. By providing energy to the actuator 8 a distance 51, which is also named a working gap or welding gap, can be adjusted between the first working surface 13 and the second working surface 63.

Purely by way of example, the actuator 8 is an electric linear drive, in particular a threaded spindle drive, and is electrically connected to the welding controller 6, which is designed to provide drive energy or drive signals to the actuator 8.

Figure 2:
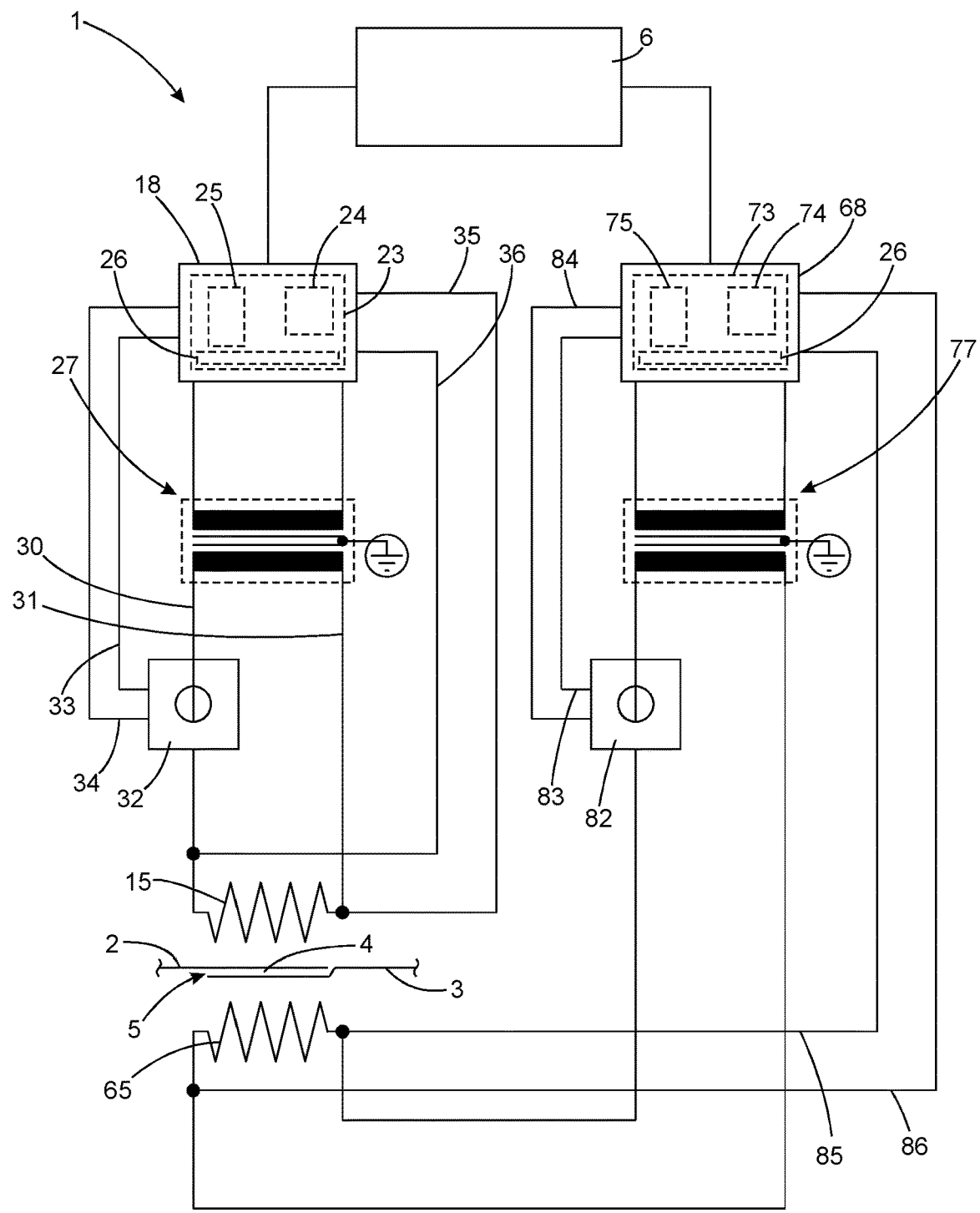
FIG. 2 shows a strictly schematic representation of the electric circuitry of the welding apparatus according to FIG. 1.

FIG. 2 shows the electric circuitry for the first heating stack 11 and for the second heating stack 61. The first electronic control circuit 18 comprises a first control unit 23 with a first microcontroller 24 and a first storage 25, in particular a ROM or EEPROM. The first microcontroller 24 is adapted to execute a software and is connected with a output stage or first power amplifier 26. Furthermore the first electronic control circuit 18 is connected with a power supply (not shown) to allow the provision of electric energy by means of an electric signal from the first microcontroller 24 to the first power amplifier 26. As soon as the electric signal arrives at the first power amplifier 26, electric energy is provided from the first power amplifier 26 via first power lines to a first transformer 27, which transforms the electric energy according to the requirements of the first heating stack 11. The first transformer 27 is connected by first supply lines 30, 31 with the first heating layer 15, which is represented in FIG. 2 by a resistor symbol. The first supply line 30 is equipped with a first current sensor 32, which is used to determine the electric current provided to the first heating layer 15 and which is connected via first sensor lines 33, 34 with the first electronic control circuit 18.

Furthermore a direct electric connection between the first electronic control circuit 18 and the first heating layer 15 is provided by first measuring lines 35, 36.

The first measuring lines 35, 36 allow the detection of an electric potential drop over the heating layer 15 if an electric current is provided by the first power amplifier 26. In this case the first electronic control circuit 18 comprises a voltmeter (not shown).

According to FIG. 2, the second electronic control circuit 68 is configured identical with the first electronic control circuit 18, the reference numbers for technically identical components are added the amount of 40.

In any case the second electronic control circuit 68 is adapted to determine the electric resistance and/or the electric impedance of the second heating layer 65. In particular the second electronic control circuit 68 cyclically determines the electric resistance and/or the electric impedance and is adapted to calculate second temperature values based on the electric resistance and/or the electric impedance. Furthermore the second electronic control circuit 68 is adapted to analyze the cyclically determined second temperature values, which form a temperature profile and to perform mathematical operations like a determination of a maximum progression value of the temperature profile. This maximum progression value and/or other characteristic values may be compared with stored (historical) values which are stored in the second storage 75.

As a result, the second electronic control circuit 68 may provide an error signal to the welding controller 6, if a deviation between the current maximum progression value and/or another current characteristic value, which is based on the temperature profile, and a stored value is greater than a predetermined threshold value.

What is claimed is:

1. A method for evaluating an operating state of a welding apparatus, the method comprising:
   providing electric energy from a first electronic control circuit to a first heating layer of a first heating stack, which first heating layer is located between a first cover layer and a first electric insulator, which first electric insulator is mounted on a first ledge; and
   detecting a second electric resistance value and/or a second electric impedance value of a second heating layer of a second heating stack, which second heating layer is connected with a second electronic control circuit and which is located between a second cover layer and a second electric insulator, which second electric insulator is mounted on a second ledge, a first welding surface of the first cover layer being thermally coupled with a second welding surface of the second cover layer,
   wherein the first electronic control circuit provides the electric energy to the first heating layer and wherein the second electronic control circuit detects the second electric resistance value and/or the second electric impedance value of the second heating layer during a direct physical contact of the first welding surface with the second welding surface.

2. A method for evaluating an operating state of a welding apparatus, the method comprising:
   providing electric energy from a first electronic control circuit to a first heating layer of a first heating stack, which first heating layer is located between a first cover layer and a first electric insulator, which first electric insulator is mounted on a first ledge; and
   detecting a second electric resistance value and/or a second electric impedance value of a second heating layer of a second heating stack, which second heating layer is connected with a second electronic control circuit and which is located between a second cover layer and a second electric insulator, which second electric insulator is mounted on a second ledge, a first welding surface of the first cover layer being thermally coupled with a second welding surface of the second cover layer,
   wherein the first electronic control circuit detects a first electric resistance value and/or a first electric impedance value of the first heating layer during the provision of the electric energy from the first electronic control circuit to the first heating layer and provides the first electric resistance value and/or the first electric impedance value to the second electronic control circuit and wherein the second electronic control circuit compares the first electric resistance value and/or the first electric impedance value with the second electric resistance value and/or with the second electric impedance value of the second heating layer to calculate a heat transfer rate between the first heating stack and the second heating stack.

3. A method for evaluating an operating state of a welding apparatus, the method comprising:
   providing electric energy from a first electronic control circuit to a first heating layer of a first heating stack, which first heating layer is located between a first cover layer and a first electric insulator, which first electric insulator is mounted on a first ledge; and
   detecting a second electric resistance value and/or a second electric impedance value of a second heating layer of a second heating stack, which second heating layer is connected with a second electronic control circuit and which is located between a second cover layer and a second electric insulator, which second electric insulator is mounted on a second ledge, a first welding surface of the first cover layer being thermally coupled with a second welding surface of the second cover layer, wherein the second electronic control circuit starts with the detection of the second electric resistance value and/or the second electric impedance value as soon as the first electronic control circuit provides the electric energy to the first heating layer and wherein the second electronic control circuit compares a progression of the second electric resistance value and/or the second electric impedance value with a stored progression of the second electric resistance value and/or the second electric impedance value.

4. A method for evaluating an operating state of a welding apparatus, the method comprising:

providing electric energy from a first electronic control circuit to a first heating layer of a first heating stack, which first heating layer is located between a first cover layer and a first electric insulator, which first electric insulator is mounted on a first ledge; and detecting a second electric resistance value and/or a second electric impedance value of a second heating layer of a second heating stack, which second heating layer is connected with a second electronic control circuit and which is located between a second cover layer and a second electric insulator, which second electric insulator is mounted on a second ledge, a first welding surface of the first cover layer being thermally coupled with a second welding surface of the second cover layer, wherein the second electronic control circuit starts with the detection of the second electric resistance value and/or the second electric impedance value after the first electronic control circuit has provided the electric energy to the first heating layer for a predetermined time interval and wherein the second electronic control circuit compares a progression of the second electric resistance value and/or the second electric impedance value with a stored progression of the second electric resistance value and/or the second electric impedance value.

\* \* \* \* \*